Figure 1:
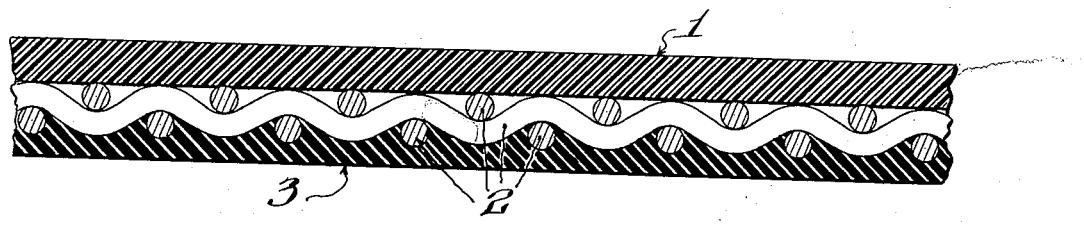

INVENTOR.
RAYMOND E. THOMAS
BY
*Frank C. Hilberg*
ATTORNEY

Patented June 29, 1954

2,682,484

UNITED STATES PATENT OFFICE 2,682,484

COATED FABRIC AND METHOD OF MAKING SAME

Raymond E. Thomas, Newburgh, N. Y., assignor to E. I. du Pont de Nemours & Company, Wilmington, Del., a corporation of Delaware Application September 18, 1950, Serial No. 185,423

10 Claims. (Cl. 117—68.5)

This invention relates to coated fabrics and more particularly to coated fabrics suitable for adhesive tape backing and still more particularly to a sterilizable cleanable backing for adhesive tape for medical and surgical use.

Heretofore, it has been the practice to make surgical tape by applying a pressure sensitive adhesive mass on one side of a cloth or paper backing and subsequently applying on the opposite side a cleanable waterproof coating. A large variety of coatings have been proposed for the waterproof coating comprising various cellulose derivatives and various synthetic resins, particularly vinyl resins. The various waterproof coatings on the adhesive tape backing represent a marked improvement over the adhesive tape backings which have an uncoated or untreated fabric exposed when in use. A disadvantage of the various waterproof coatings used heretofore is that they are usually applied from a solution, which is a relatively expensive method in that the volatile solvent is lost or if recovered involves the use of expensive solvent recovery apparatus. A further disadvantage is that the methods employed heretofore for applying the waterproof coatings have resulted in the waterproof coating striking through the interstices of the fabric and interfering with the adhesion of the pressure sensitive adhesive mass subsequently applied on the side of the fabric opposite the waterproof coating.

A new method of applying polyvinyl chloride plastisol coatings, commonly referred to as paste coatings, to fabric supports in the absence of volatile solvents has recently been introduced in the coated fabric industry. This process involves dispersing uncolloided polyvinyl chloride powder along with pigments and fillers, in a non-volatile plasticizer which is a non-solvent for the resin at room temperature and a solvent for the resin at elevated temperatures, in the absence of volatile solvents. The viscous paste-like composition is spread on a support, and then subjected to sufficient heat to gelatinize the polyvinyl chloride in situ. The paste process as described above is adapted for spreading thick films, i. e. in the order of 10.0 to 20.0 ounces per square yard or heavier in a single coat. In order to spread thin films of the paste compositions corresponding to 4.0 ounces or less per square yard it is necessary to thin or dilute the heavy viscous paste with a volatile diluent which is compatible with the plasticizer and has no solvent action on the resin at room temperature. When the heavy pastes are thinned with volatile diluents to reduce the viscosity and amount spread in a single coat to 4.0 ounces (dry) or less per square yard the composition strikes through the interstices and interferes with the anchorage of the pressure sensitive adhesive applied to the opposite side, when such coated fabrics are used in the manufacture of cleanable adhesive tape.

It is therefore an object of this invention to prepare a coated fabric suitable for use as cleanable adhesive tape backing at a relatively low cost which may, if necessary, be sterilized at relatively high temperatures. Another object of this invention is to provide a method of preparing adhesive tape backing in which a polyvinyl chloride composition is deposited on a fabric backing in the absence of appreciable amounts of volatile solvent. A further object is to provide a waterproof adhesive tape backing firmly attached to one side of a textile fabric and a pressure sensitive adhesive mass firmly attached to the opposite side. A still further object is the provision of a method for coating relatively light weight fabrics with a waterproof coating with a minimum of striking through the fabric by the composition. A still further object is the provision of a polyvinyl chloride plastisol composition capable of being spread in a thin film on a light weight fabric and without striking through the fabric. These and other important objects will be readily apparent as the description of the invention proceeds.

The foregoing objects are accomplished by preparing a polyvinyl chloride plastisol composition in which ungelatinized polyvinyl chloride powder and pigments are uniformly dispersed in a plasticizer which is a non-solvent for the polyvinyl chloride at room temperature and is a solvent for the polyvinyl chloride at elevated temperatures, separately preparing a second composition in which a polyvinyl acetate containing resin is dispersed in a volatile liquid medium which is a non-solvent for the polyvinyl chloride, combining the two compositions in certain ratios with thorough mixing, spreading the mixed composition in the form of a thin film on a relatively light weight open weave fabric, heating to evaporate the volatile liquid and further heating to gelatinize the polyvinyl chloride in situ. A pressure sensitive adhesive may then be applied to the uncoated side of the fabric.

In a modification of the invention the polyvinyl acetate containing resin may be applied separately to the open weave fabric in the form of a solution in an organic solvent to bridge the interstices of the fabric without striking through and then subsequently the polyvinyl chloride plastisol dispersion may be applied over the polyvinyl acetate coating. It is preferred for economical reasons to add the polyvinyl acetate containing resin to the diluted paste composition in which the waterproofing and bridging composition is applied in a single coat, thus eliminating one coating operation.

Figure 2:
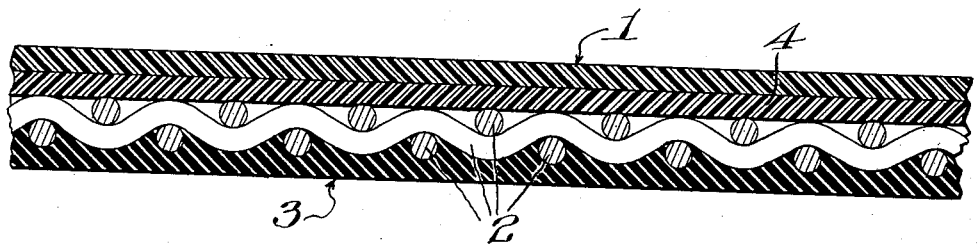

In the accompanying drawing, Figure 1 represents a diagrammatic cross section of the preferred embodiment of the invention in which 1 represents the waterproof coating, 2 the woven fabric base, and 3 the pressure sensitive adhesive. Figure 2 represents a similar diagrammatic cross section showing a bridging coat 4 applied to the fabric before the waterproof coating 1. This figure also shows the pressure sensitive adhesive 3 on the opposite side of the fabric.

Throughout the specification and appended claims the term "polyvinyl acetate containing resin" is used to designate the homopolymers of vinyl acetate and copolymers of vinyl chloride and vinyl acetate possessing bridging properties in which the vinyl acetate content of the polymer may vary between 10% and 100% and the vinyl chloride content may vary between 90% and zero. For the purpose of carrying out this invention the homopolymer of vinyl acetate is preferred.

The invention will be more fully understood by a description of specific examples, although it is to be understood that they are given by way of illustration and not limitation.

EXAMPLE I

A bleached square weave cotton fabric running 4.00 yards per pound per 39" width, having a thread count of 80 x 80 (number of threads per inch in warp and filler directions) was coated on one side with a coat of the following waterproofing composition in parts by weight:

Part A

| | Per cent |
|---|---|
| Polyvinyl chloride powder | 20.80 |
| Polypropylene glycol adipate | 14.50 |
| Pigment-plasticizer mill base [1] | 40.80 |
| Ethyl acetate | 3.60 |
| Ethyl alcohol | 3.70 |
| Isopropyl alcohol | 2.20 |

Part B

| | Per cent |
|---|---|
| Polyvinyl acetate | 2.88 |
| Ethyl acetate | 5.76 |
| Ethyl alcohol | 5.76 |

[1] Pigment-plasticizer mill base:

| | Per cent |
|---|---|
| Titanium dioxide | 18.43 |
| Barytes | 43.10 |
| Polypropylene glycol adipate | 27.69 |
| Isopropyl alcohol | 5.39 |
| Ethyl acetate | 2.69 |
| Ethyl alcohol | 2.70 |

The above composition was prepared by first grinding the titanium dioxide and barytes in the polypropylene glycol adipate in a conventional manner. To the pigment dispersion is added the polypropylene glycol adipate, volatile liquids, and polyvinyl chloride powder. The mass was stirred until homogeneous and the ungelatinized polyvinyl chloride was dispersed along with the pigment in the plasticizer and volatile liquids to form a thin flowable paste, referred to as Part A of the above formula. The polyvinyl acetate was separately dissolved in the ethyl acetate-ethyl alcohol mixture to form Part B of the above formula and then added to the Part A followed by thorough mixing.

The above composition was applied to the fabric with conventional doctor knife coating equipment and then passed through a heat zone (240–320° F.) to evaporate the volatile liquids and partially fuse or "set" the composition. Sufficient composition was spread on the fabric to deposit 1.5 to 1.8 ounces of dry coating per square yard. The coated fabric was then given an additional heat treatment about 350–370° F. to gelatinize the polyvinyl chloride and completely fuse the coating.

The dry film was firmly anchored to the fabric with substantially no striking through the interstices of the fabric by the composition. The coated fabric was further processed by passing the coated fabric between pressure rolls, one of which was a heated steel roll with a shallow grain engraved on its surface, and the other a paper counter roll as commonly employed in embossing coated fabrics. The embossing treatment is not essential but is preferred to enhance the appearance of the finished product.

The material at this stage may be rolled up and stored or may be further processed immediately by applying a pressure sensitive adhesive on the uncoated side of the fabric. A suitable composition for this purpose is as follows in parts by weight:

| | Per cent |
|---|---|
| Crude rubber | 8.1 |
| Rosin | 7.7 |
| Zinc oxide | 12.1 |
| Wool fat | 12.1 |
| Benzene | 60.0 |

Following the application of the pressure sensitive adhesive to the side of the fabric opposite the waterproof coating, the material was cut into strips and wound on spools ready for use. The material was waterproof. Should it become soiled while in use it may be readily cleaned with soap and water.

A wide variety of pressure sensitive adhesives may be employed in the present invention. The one given above is merely illustrative, many such compositions being known to the workers in the art. Such compositions usually consist of rubber, rosin or resins, wax or oil, and a filler or absorbent powder (for example, zinc oxide, orris root, and starch).

For convenience in spreading, the adhesive mass should be free from nodules. Especially desirable results have been obtained with compositions containing approximately 20% of pure rubber based on the non-volatile components of the composition on the same basis. The volatile solvent of the spreading mass may vary widely, although 40 to 50% is usually used.

The amount of pressure sensitive adhesive applied usually runs between 5.5 and 7.0 ounces per square yard. The intermediate range of 6.2 to 6.7 has been found to be the most desirable for ordinary surgical tape.

Another preferred pressure sensitive adhesive mass consists of the following in parts by weight:

| | Per cent |
|---|---|
| Crude rubber | 10 |
| Zinc oxide | 5 |
| Mineral oil | 35 |
| Benzene | 50 |

The ingredients are combined by mixing the rubber with the benzene until thoroughly dissolved, and thereafter mixing with a cream or paste formed by thoroughly mixing the zinc oxide with the mineral oil. After the rubber mass has been applied the tape may be cut up into narrow widths and made up into small spools ready for use. The pressure sensitive adhesive per se is not a part of this invention and may be varied widely as suggested above.

It is sometimes desirable to sterilize the adhesive tape, in which case, following the application of the pressure sensitive rubber adhesive mass, the material is cut into narrow strips and short lengths approximately ¾ inch wide and approximately 3 inches long. A small piece of gauze approximately ¾ inch wide and 1 inch long is then adhered to the rubber adhesive in the center of the cut strip and two pieces of crinoline fabric are then applied over the uncovered pressure sensitive rubber adhesive mass, which overlaps the adhered gauze. The material is then placed in a suitable paper container and sealed. The sealed container must withstand sterilizing conditions and allow the heat to penetrate the container in order that the enclosed adhesive tape will be sterilized. An example of a suitable container is a glassine type of paper. The sealed package containing the adhesive tape is then subjected to an atmosphere of steam for 30 minutes at a temperature of 115° C. The material is then suitably packed and stored.

The following examples illustrate other compositions which may be used to coat the fabric to render it waterproof and cleanable, and/or bridge the interstices of the fabric without striking through. It is to be understood that the process of preparing the coating composition as well as the method of coating, fusing, embossing and application of the pressure sensitive adhesive given in Example I likewise applies to the other examples.

EXAMPLE II

To a suitable fabric as described in Example I was applied the following bridging composition to close the interstices of the fabric without striking through the fabric to the opposite side.

| | Per cent by weight |
|---|---|
| Polyvinyl acetate | 9.1 |
| Polypropylene glycol adipate | 9.1 |
| Ethyl alcohol | 40.9 |
| Ethyl acetate | 40.9 |

The above composition was applied to the fabric in a conventional manner, such as doctor knife coating. After the fabric was coated the material was passed through a heat zone to expel the volatile solvent, sufficient composition was applied to deposit .3 to .5 ounce of dry (nonvolatile) coating per square yard. The interstices of the fabric were bridged by the above composition with substantially no striking through the fabric. The coated fabric was then further processed in the same manner and with the same waterproof composition described in Example I. The heat treatment to fuse the polyvinyl chloride coating, embossing and application of the pressure sensitive adhesive was also carried out in the same manner as described in Example I.

EXAMPLE III

The following waterproof coating may be used in place of that described in Example I.

Part A

| | Per cent by weight |
|---|---|
| Polyvinyl chloride powder | 27.3 |
| Polypropylene glycol adipate | 27.2 |
| Pigment plasticizer mill base (same as in Example I) | 24.8 |

Part B

| | Per cent by weight |
|---|---|
| Polyvinyl acetate | 1.6 |
| Ethyl alcohol | 9.6 |
| Ethyl acetate | 9.5 |

The above compositions were applied to a fabric base as in Example I with respect to amounts deposited and in processing. The finished surgical tape was cleanable and could be sterilized. The adhesion of the rubber-sensitive adhesive to the fabric base was very satisfactory.

EXAMPLE IV

A waterproof adhesive tape backing was made in accordance with the procedure outlined in Example II except that the following pigmented composition was employed for the bridging coat:

| | Per cent by weight |
|---|---|
| Polyvinyl acetate | 13.79 |
| Polypropylene glycol adipate | 6.90 |
| Pigment-plasticizer mill base (same as Example I) | 24.13 |
| Ethyl acetate | 27.59 |
| Ethyl alcohol | 27.58 |

EXAMPLE V

The following waterproof coating composition may be used in place of that described in Example I, wherein no separate bridge coat is applied:

Part A

| | Per cent by weight |
|---|---|
| Polyvinyl chloride powder | 33.90 |
| Dioctyl phthalate | 12.60 |
| Pigment-plasticizer mill base [1] | 44.41 |

Part B

| | Per cent by weight |
|---|---|
| Copolymer of 85 vinyl chloride and 15 vinyl acetate | .91 |
| Ethyl acetate | 8.18 |

[1] Pigment-plasticizer mill base:

| | Per cent by weight |
|---|---|
| Titanium dioxide | 21.49 |
| Barytes | 50.12 |
| Dioctyl phthalate | 24.80 |
| Blown castor oil | 3.59 |

In the foregoing examples the polyvinyl acetate or polyvinyl acetate containing resin is dissolved in an organic solvent before adding to the polyvinyl chloride plastisol dispersion. It is within the scope of this invention to add the polyvinyl acetate in the form of an aqueous dispersion instead of an organic solution.

As noted in the examples, the content of polyvinyl acetate or polyvinyl acetate containing resin of the waterproofing composition may vary between 2.6% and 12.19% based on the combined weight of the polyvinyl chloride and polyvinyl acetate, the latter being present as a homopolymer or a copolymer, but the useful range is 2.6% to 50.0%. The invention is not to be limited to these particular ranges, except as defined in the appended claims, since lesser and greater amounts of the polyvinyl acetate may be used with varying degrees of success, with respect to bridging the interstices of open weave fabrics.

In applying the waterproof coating to the fabric for use as cleanable adhesive tape backing it is preferred to apply the thinnest amount possible to obtain a waterproof coating without unduly stiffening the fabric. Coatings which weigh less than about 1.0 ounce per square yard are too thin to give waterproof cleanable coatings, and those weighing more than about 4.0 ounces per square yard render the coated fabric too bulky and stiff for adhesive tape use. In the claims and throughout the specification "thin film" is intended to refer to a film weighing 1.0 ounce to 4.0 ounces per square yard after the volatile solvent has been evaporated from the film. For application of the coated fabric other than adhesive tape backing, it will be readily apparent that the invention will also be useful in bridging of light weight open weave fabrics with a film deposited in a single coat which weighs more than 4.0 ounces per square yard.

A light weight woven fabric running 6.40 yards per pound per 44" width and having a thread count of 48 x 48 may be bridged with a film weighing 6.0 to 8.0 ounces (dry) per square yard and deposited from a polyvinyl chloride-polyvinyl acetate composition similar to that described in Example I.

In the specific examples one particular fabric has been described, but it is to be understood that other fabrics may be used and a wide variation in the fabric construction is permissible within the scope of this invention. While the invention is adapted to bridging the interstices of woven fabrics, it is also useful in coating nonwoven fabrics and papers where it is desired to coat the surface of the fabric or paper with a minimum of penetration of the coating composition. By the term "open weave" is meant a woven fabric having interstices.

White pigments other than titanium dioxide may be used in practicing this invention, such as, e. g., lithopone and zinc oxide. Colored pigments, such as chrome yellow, chrome green, red oxide, ultramarine blue, etc., may be used alone or in mixtures or used with white pigments to produce tints if desired. Fillers other than barytes, such as, e. g., china clay, diatomaceous earth, mica, etc., may be used with white or colored pigments. The choice of pigment or pigments is not critical and depends upon the desired color of the waterproof coating. Pigments which contain copper or manganese are to be avoided since they have a deleterious effect on the rubber in the pressure sensitive adhesive.

While there are several known plasticizers for the polyvinyl chloride-polyvinyl acetate composition of this invention, those which will not be driven from the waterproof coating during sterilizing conditions are preferred in practicing this invention. Polymeric plasticizers have less tendency to migrate during the various heat treatments of the coating and for this reason they are preferred. In addition to the polypropylene glycol adipate listed in the specific examples, other polymeric plasticizers derived from dibasic acids, such as, e. g., adipic, azelaic, sebacic and terephthalic, may be used. Where the adhesive tape product is not to be sterilized, monomeric type plasticizers may be used, such as, e. g., dibutyl phthalate, dibutyl sebacate, dibutoxy ethyl phthalate and tricresyl phosphate. Blends of monomeric and polymeric plasticizers may also be used. The invention is not limited to any particular plasticizer as long as it has no appreciable solvent action on the polyvinyl chloride resin at room temperature and will fuse or weld together with the polyvinyl chloride at elevated temperatures. Also the plasticizer must be innocuous to pressure sensitive adhesive. A further consideration for the choice of plasticizer and amount used is that it should be compatible with both the polyvinyl chloride and polyvinyl acetate.

In general, alcohols and esters may be employed as the solvent for forming the polyvinyl acetate solution and diluting the polyvinyl chloride plastisol coating. Appreciable amounts of ketones are to be avoided since they have a solvent action on the polyvinyl chloride which increases the viscosity to a point where thin films in the order mentioned above can not be applied by conventional coating techniques.

The volatile liquid content of the composition may vary somewhat. The controlling factor in this case is the viscosity of the coating composition. The viscosity limits may vary over a rather wide range, such as, e. g., 50 to 200 seconds as determined by the Stormer viscosimeter using the 1000 gm. weight for 100 revolutions. A viscosity range of 75 to 125 seconds is preferred.

The product of this invention finds particular use as medical and surgical adhesive tape and plaster where a sterile waterproof, non-soiling and washable product is desirable or necessary. Because of the desirable properties possessed by the product of this invention, other important uses will readily become apparent to those skilled in the art of such products.

While the invention has been described with reference to the production of a waterproof adhesive tape material having a thin coating on one side of an open weave fabric and a pressure sensitive adhesive on the opposite side, the invention is also useful in the production of light weight coated fabrics in general without the pressure sensitive adhesive.

An important advantage of this invention is the improvement of adhesion of the pressure sensitive adhesive mass to the side of the fabric opposite the waterproof coating. When the adhesive tape is rolled on a spool there is contact between the pressure sensitive adhesive and the waterproof coating. The adhesion of the waterproof coating and the pressure sensitive adhesive to the fabric must be greater than the adhesion to each other, otherwise, when the adhesive tape is unrolled, the pressure sensitive adhesive will pick off on the waterproof coating or vice versa. Another advantage of the invention is the provision of a cleanable waterproof coating which will not stiffen under conditions necessary for sterilization. These and other important advantages will be readily apparent to those skilled in the art.

It is apparent that many widely different embodiments of this invention may be made without departing from the spirit and scope thereof, and therefore, it is not intended to be limited except as indicated in the appended claims.

I claim:

1. The process of coating an open weave fabric with a thin film comprising preparing a plastisol composition comprising ungelatinized polyvinyl chloride dispersed in a plasticizer which in a non-solvent for the polyvinyl chloride at room temperature, preparing a separate composition comprising a polyvinyl acetate containing resin dispersed in a volatile liquid medium which is a non-solvent for the polyvinyl chloride at room temperature, said plasticizer being a plasticizer for both polyvinyl chloride and polyvinyl acetate, combining and thoroughly mixing the said compositions, applying the polyvinyl chloride-polyvinyl acetate containing composition to an uncoated open weave fabric base, whereby the interstices are bridged only without striking through, heating to evaporate the volatile liquid, further heating to gelatinize the polyvinyl chloride in situ and cooling to room temperature.

2. The process of claim 1 in which the polyvinyl acetate containing resin represents 2.6% to 50.0% of the combined weight of the polyvinyl acetate and polyvinyl chloride.

3. The process of claim 1 in which the plasticizer is a non-migrating polymeric plasticizer.

4. The process of claim 1 in which the plasticizer is polypropylene glycol adipate.

5. The process of claim 1 in which the polyvinyl chloride-polyvinyl acetate composition is applied to the fabric base in amount corresponding to about 1.0 ounce to 4.0 ounces per square yard on a dry weight basis.

6. The process of coating an open weave fabric comprising preparing a plastisol composition comprising ungelatinized polyvinyl chloride dispersed in a plasticizer which is a non-solvent for the polyvinyl chloride at room temperature, preparing a separate composition comprising polyvinyl acetate dispersed in an aqueous medium, combining and thoroughly mixing the said compositions, applying the polyvinyl chloride-polyvinyl acetate containing composition to an uncoated open weave fabric base, heating to evaporate the volatile liquid, further heating to gelatinize the polyvinyl chloride in situ and cooling to room temperature.

7. The product of the process of claim 6.

8. The process of coating an open weave fabric comprising preparing a plastisol composition comprising ungelatinized polyvinyl chloride dispersed in a plasticizer which is a non-solvent for the polyvinyl chloride at room temperature, preparing a separate composition comprising a solution of a polyvinyl acetate containing resin in an organic volatile liquid which is a solvent for the polyvinyl acetate containing resin and a non-solvent for the polyvinyl chloride resin, combining and thoroughly mixing said compositions, applying the polyvinyl chloride-polyvinyl acetate containing composition to an uncoated open weave fabric base, heating to evaporate the volatile liquid, further heating to gelatinize the polyvinyl chloride in situ and cooling to room temperature.

9. The product of the process of claim 8.

10. The process of claim 8 in which a pressure-sensitive rubber adhesive is applied to the side opposite the polyvinyl composition after the fabric is cooled to room temperature.

References Cited in the file of this patent

UNITED STATES PATENTS

| Number | Name | Date |
|---|---|---|
| 2,188,396 | Semon | Jan. 30, 1940 |
| 2,201,877 | Anderson | May 21, 1940 |
| 2,431,078 | Powell et al. | Nov. 18, 1947 |

FOREIGN PATENTS

| Number | Country | Date |
|---|---|---|
| 580,729 | Great Britain | Sept. 18, 1946 |